US011049313B2

(12) United States Patent
    Bilgili

(10) Patent No.: US 11,049,313 B2
(45) Date of Patent: Jun. 29, 2021

(54) RENDERING AN OBJECT

(71) Applicant: Siemens Healthcare GmbH, Erlangen (DE)

(72) Inventor: Ahmet Bilgili, The Hague (NL)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/434,198

(22) Filed: Jun. 7, 2019

(65) Prior Publication Data

US 2020/0035011 A1    Jan. 30, 2020

(30) Foreign Application Priority Data

Jul. 27, 2018    (EP) .................................... 18186166

(51) Int. Cl.
    *G06T 15/00*    (2011.01)
    *G06T 19/00*    (2011.01)

(52) U.S. Cl.
    CPC .......... *G06T 15/005* (2013.01); *G06T 19/006* (2013.01)

(58) Field of Classification Search
    None
    See application file for complete search history.

(56) References Cited

U.S. PATENT DOCUMENTS

| 2013/0011051 | A1* | 1/2013 | Bottisti | ................. G06K 9/522 382/159 |
| 2013/0058657 | A1* | 3/2013 | Bucholtz | ............ H03M 1/1235 398/115 |
| 2013/0271625 | A1* | 10/2013 | Gruber | ............... G06K 9/00671 348/239 |
| 2015/0301592 | A1* | 10/2015 | Miller | ..................... G06F 3/016 345/156 |
| 2018/0247393 | A1* | 8/2018 | Ohga | ...................... G06T 5/006 |

OTHER PUBLICATIONS

Marwah, Kshitij, et al. "Compressive light field photography using overcomplete dictionaries and optimized projections." ACM Transactions on Graphics (TOG) 32.4 (2013): pp. 1-12.
Venkatraman, Vishwesh, Lee Sael, and Daisuke Kihara. "Potential for protein surface shape analysis using spherical harmonics and 3D Zernike descriptors." Cell biochemistry and biophysics 54.1-3 (2009): 23-32.

(Continued)

*Primary Examiner* — Nurun N Flora

(57) ABSTRACT

An object in a virtual three-dimensional space is rendered. A first plurality of pixel values of a first image captured by a camera in real space is obtained, The first plurality of pixel values are associated with a first three-dimensional position, in the virtual three-dimensional space, of the camera when the first image was captured. Each one of the first plurality of pixel values are associated with an orientation in the virtual three-dimensional space, of a portion of a light field represented by the pixel. Using compressive sensing and based on the first plurality of pixel values, a light field value for at least one second position, different from the first position, is estimated in the virtual three-dimensional space. An object is rendered in the virtual three-dimensional space, located at the second position, using the estimated light field value.

17 Claims, 5 Drawing Sheets

(56) References Cited

OTHER PUBLICATIONS

Extended European Search Report (EESR) dated Jan. 9, 2019 in corresponding European patent application No. 18186166.7.
Amit Ashok et al: "Compressive light field imaging"; Proceedings of SPIE; vol. 7690; Apr. 23, 2010 (Apr. 23, 2010); p. 769000; XP055537855; 1000 20th St. Bellingham WA 98225-6705 USA.
A Quintana et al: "An Augmented Reality System Based on Light Fields"; Proceedings of the International Conference on Computer Graphics Theory and Applications (GRAPP 2012) and International Conference on Information Visualization Theory and Applications (IVAPP 2012); Feb. 24, 2012 (Feb. 24, 2012); pp. 453-459.
Joel Kronander et al: "Photorealistic rendering of mixed reality scenes"; Computer Graphics Forum; vol. 34; No. 2; May 2015 (May 2015); pp. 643-665; XP055537858; GB.
Greger G et al: "The Irradiance Volume"; IEEE Computer Graphics and Applications; IEEE Service Center; New York, NY, US; vol. 18; No. 2; Mar. 1998 (Mar. 1998); pp. 32-43.
Gupta Mayank et al: "Compressive Light 1-17 Field Reconstructions Using Deep Learning"; 2017 IEEE Conference on Computer Vision and Pattern Recognition Workshops (CVPRW); IEEE; Jul. 21, 2017 (Jul. 21, 2017); pp. 1277-1286; XP033145910; DOI: 10.1109/CVPRW.2017.168 [retrieved on Aug. 22, 2017] / Jul. 21, 2017.
Babacan S D et al: "Compressive Light Field Sensing"; IEEE Transactions on Image Processing; IEEE Service Center; Piscataway, NJ, US; vol. 21; No. 12; Dec. 2012 (Dec. 2012); pp. 4746-4757.
Abad F et al: "Integrating synthetic objects into real scenes"; Computers and Graph; Elsevier; GB; vol. 27; No. 1; Feb. 2003 (Feb. 2003); pp. 5-17.

\* cited by examiner

RENDERING AN OBJECT

RELATED CASE

This application claims the benefit of EP 18186166, filed on Jul. 27, 2018, which is hereby incorporated by reference in its entirety.

TECHNICAL FIELD

The present embodiments relate to rendering an object, and more particularly to rendering an object in a virtual three-dimensional space.

BACKGROUND

Rendering realistic images of virtual objects, such as from three-dimensional (3D) computer models for augmented reality (AR) or virtual reality (VR) applications, can depend on several factors such as lighting, shadowing and material properties of a given object.

A known technique of lighting an object in a 3D computer model is to assume that a light source is at infinite distance from the object such that the lighting condition is independent of the position of the object in the virtual space.

However, this technique can lead to the generation of un-realistic images. For example, in closed environments such as in medical operation rooms, it can be important that an object is rendered under appropriate lighting conditions in order to appear realistic.

A known technique in AR is to capture an ambient colour of the real environment in which a user is situated, and to render a virtual object using the ambient colour. However, the problem still remains that in some environments the lighting condition assumptions will not be appropriate and hence the virtual object will not appear realistic.

It is therefore desirable to provide for a realistic yet efficient rendering of virtual objects.

SUMMARY

According to a first aspect, there is provided a method of rendering an object in a virtual three-dimensional space, the method includes: obtaining a first plurality of pixel values of a first image captured by a camera in real space, the first plurality of pixel values being associated with a first three-dimensional position, in the virtual three-dimensional space, of the camera when the first image was captured, each one of the first plurality of pixel values being associated with an orientation in the virtual three-dimensional space, of a portion of a light field represented by the pixel; estimating, using compressive sensing, and based on the first plurality of pixel values, a light field value for at least one second position, different from the first position, in the virtual three-dimensional space; and rendering an object, in the virtual three-dimensional space, located at the second position, using the estimated light field value.

Optionally, the method includes: determining a position and orientation of the camera in real space; and determining, based at least in part on the determined position and orientation of the camera in real space, the first position in the virtual three-dimensional space and the orientation, in the virtual three-dimensional space, with which each pixel value is associated.

Optionally, determining the orientation with which each pixel value is associated includes: projecting the pixel values of the first image onto a hemisphere located at the first position; and determining, based on the projection, the orientation with which each pixel value is associated.

Optionally, projecting the pixel values of the first image onto the hemisphere includes: using equirectangular projection of the pixel values of the first image onto a cosine weighted hemisphere.

Optionally, the method includes: capturing the first image using the camera.

Optionally, the camera is mounted to an augmented reality or virtual reality headset.

Optionally, rendering the object includes rendering a representation of the object on a display screen of the augmented reality or virtual reality headset.

Optionally, the virtual three-dimensional space is discretised into discrete positions and discrete orientations, each discrete position being associated with a plurality of discrete orientations; wherein each of the one or more orientations with which each pixel value is associated is a discrete orientation, wherein the first position is a first discrete position, and wherein the second position is a second discrete position, different to the first discrete position.

Optionally, estimating the light field value using compressive sensing includes reconstructing, from the first plurality of pixel values associated with the first discrete position, the light field at each of the discrete positions and discrete orientations, by estimating a solution to an underdetermined set of linear equations.

Optionally, estimating the light field value using compressive sensing includes: minimizing the $l_1$ norm of e in the equation f=Θe; where: f is an s×1 vector of the plurality of first pixel values indexed for the first discrete position and for the discrete orientations with which each pixel value is associated; e is a t×1 vector, where s<t, of estimated light field values indexed for all of the discrete positions and discrete orientations into which the virtual three-dimensional space is discretised; and Θ is a s×t transformation matrix for reconstructing e from f.

Optionally, Θ=ΦΨ, where: Ψ is a representation matrix for transforming e into a sparse domain; and Φ is a sensing matrix including a set of predetermined random values; and wherein the method further includes applying, after the minimization of the $l_1$ norm of e, the inverse of Ψ to e, to obtain the estimate of light field values at all the discretised positions and orientations within the virtual three-dimensional space.

Optionally, Ψ is a Discrete Fourier Transform matrix.

Optionally, the light field value includes a radiance value.

Optionally, the method further includes: obtaining a second plurality of pixel values of a second image captured by the camera in real space, the second image being captured at a position or with an orientation in real space different to that of the camera when the first image was captured; wherein estimating the light field value for the at least one second position is based at least in part on the first plurality of pixel values and the second plurality of pixel values.

According to a second aspect, there is provided an apparatus arranged to perform the method according to the first aspect.

Optionally, the apparatus is an augmented reality or a virtual reality headset.

According to a third aspect, there is provided a non-transitory computer readable medium having instructions stored thereon which, when executed on a computer causes the computer to perform the method according to the first aspect.

Further features and advantages of the invention will become apparent from the following description of preferred embodiments of the invention, given by way of example only, which is made with reference to the accompanying drawings.

DETAILED DESCRIPTION

A known technique of lighting an object in a 3D computer model is to assume that a light source is at infinite distance from the object such that the lighting condition is independent of the position of the object in the virtual space. However, this technique can lead to the generation of un-realistic images. One way to ensure that a lighting condition appropriate for a real environment is used to render a virtual object would be to measure the light field at each position and direction in the real environment. However, this would be costly and time consuming, and would not enable dynamic adaption to changes in the real environment. Further, the five-dimensional data set produced (three position coordinates and two direction coordinates) would be large and hence may be time consuming and inefficient to acquire and process. This may be of particular concern, for example, in AR or VR headset devices where processing power and/or memory may be limited. It is therefore desirable to provide for a realistic yet efficient rendering of virtual objects.

Figure 1:
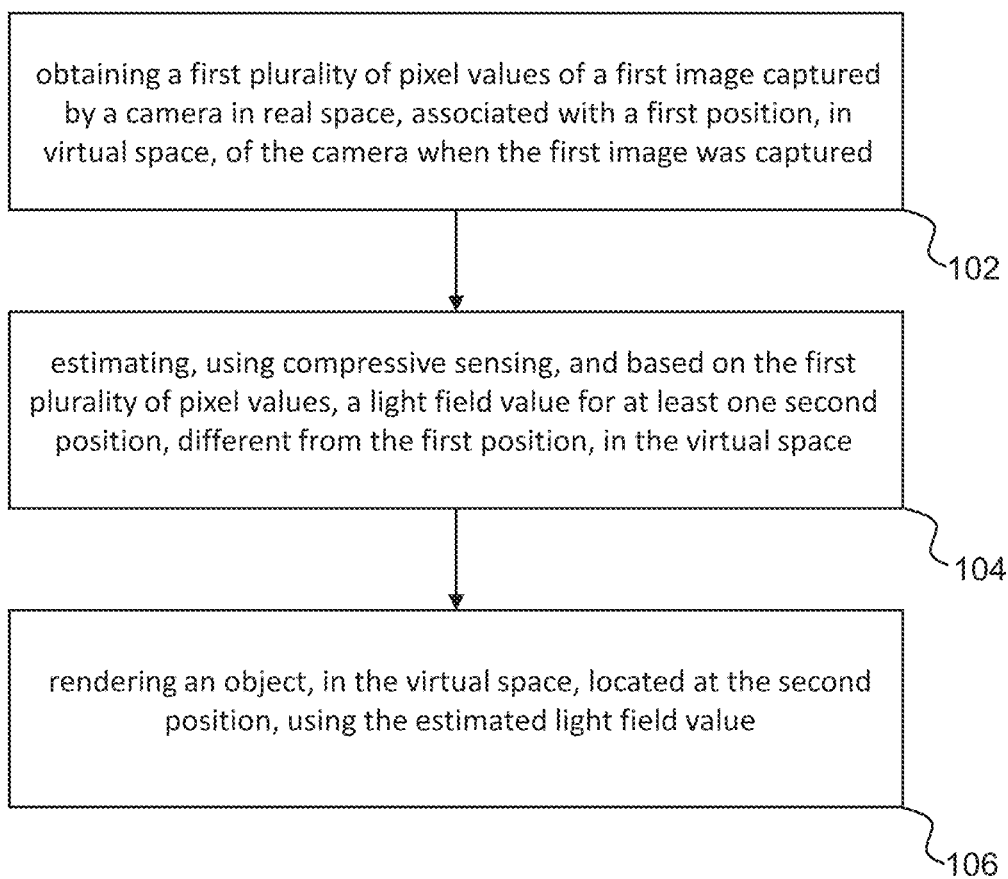
FIG. 1 is a flow diagram that illustrates a method if rendering an object according to an example.

Referring to FIG. 1, there is illustrated a method of rendering an object in a virtual three-dimensional space. The method may provide for an efficient yet realistic rendering of virtual objects.

In broad overview, the method includes, in step 102, obtaining a first plurality of pixel values of a first image captured by a camera in real space. The first plurality of pixel values is associated with a first three-dimensional position, in the virtual three-dimensional space, of the camera when the first image was captured, and each one of the first plurality of pixel values is associated with an orientation, in the virtual three-dimensional space, of a portion of a light field represented by the pixel.

The method includes, in step 104, estimating, using compressive sensing, and based on the first plurality of pixel values, a light field value (e.g. radiance value) for at least one second position, different from the first position, in the virtual three-dimensional space.

The method includes, in step 106, rendering a virtual object located at the second position, in the virtual three-dimensional space, using the estimated light field value.

As explained in more detail hereinafter, rendering an object in virtual space using a light field value (e.g. radiance value) estimated using compressive sensing and based on pixel values from an image captured by a camera in real space, may allow for an efficient yet realistic rendering of the object, i.e. one which accounts for the actual lighting conditions of the real environment.

Figure 2:
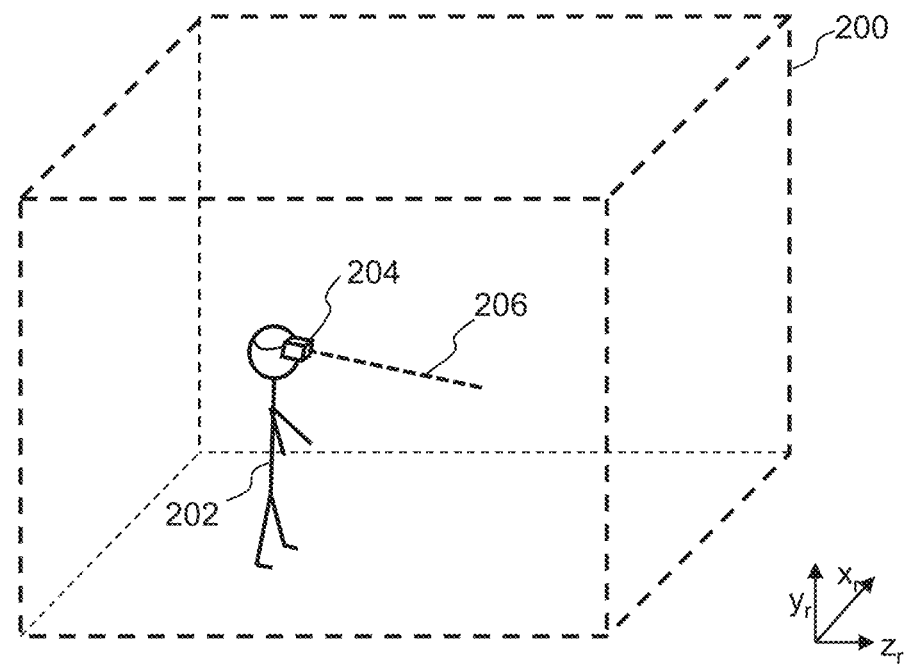
FIG. 2 is a schematic diagram that illustrates a real space containing a person wearing an AR/VR headset according to an example.

Referring to FIG. 2, there is illustrated schematically an example real three-dimensional (hereinafter 3D) space 200. The real space has a real-space cartesian coordinate system defined by $x_r$, $y_r$, $z_r$. The 3D space 200 contains a user 202. The user is wearing an augmented reality (hereinafter AR) or virtual reality (hereinafter VR) headset 204 (see also the headset 204 described below in relation to FIG. 9). The headset 204 includes a camera (not shown in FIG. 2 but see an example camera 250 is described below in relation to FIG. 9). In this example, the focal axis 206 of the camera is parallel, and in some examples may be substantially colinear, with a line of sight of the user 202. The camera is arranged to capture images of the real space 200 environment. For example, the camera may capture the first image referenced with respect to step 102 of FIG. 1.

Figure 3:
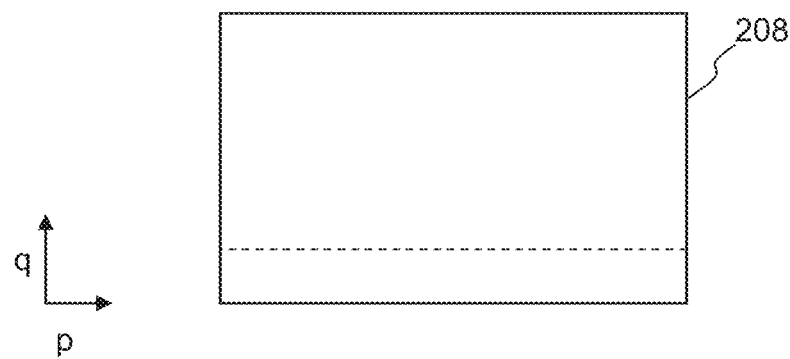
FIG. 3 is a schematic diagram that illustrates a virtual space corresponding to the real space of FIG. 2, and a first position in the virtual space, according to an example.

Referring to FIG. 3, there is illustrated schematically an example first image 208, for example captured by the camera. The first image 208 is a two-dimensional (hereinafter 2D) image. The first image 208 includes a first plurality of pixels, each having a pixel value. Each pixel value is taken to represent the portion of the light field (e.g. a radiance value) of the real space 200, captured by the camera, at the pixel. The location of each pixel within the image is defined by 2D cartesian coordinate system p, q.

Figure 4:
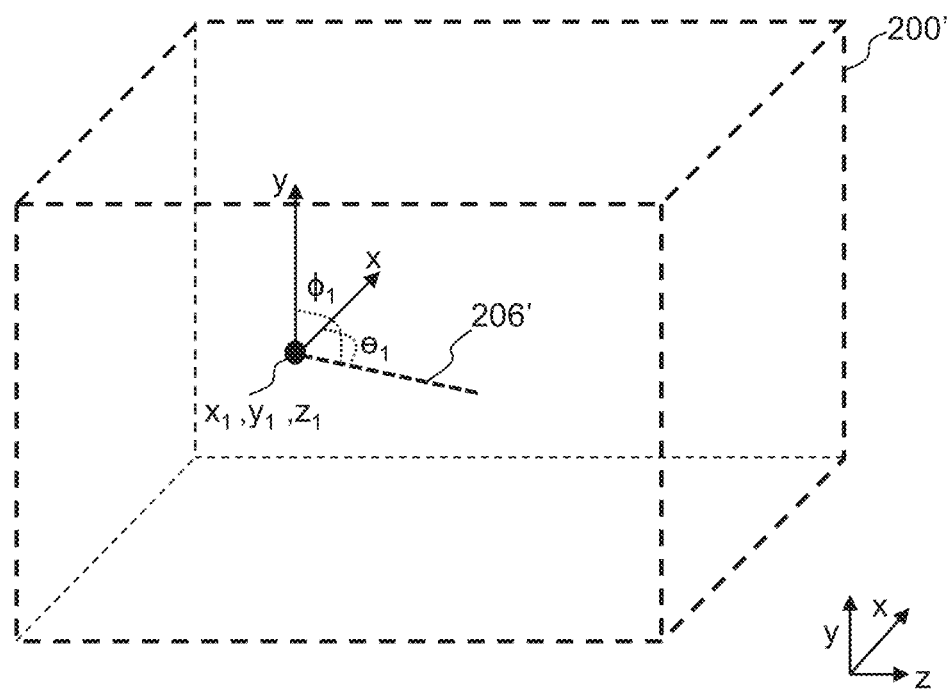
FIG. 4 is a schematic diagram that illustrates an image captured by a camera of the AR/VR headset in the real space according to an example.

Referring to FIG. 4, there is illustrated schematically an example virtual 3D space 200'. The virtual space has a virtual-space cartesian coordinate system defined by x, y, z. Although not explicitly shown in FIG. 4, the virtual 3D space 200' is discretised. Specifically, the virtual space 200' is discretised into equal volume portions, each having a discrete position in the virtual space. Each discrete position within the virtual space may be given as an indexed coordinate as $x_i$, $y_j$, $z_k$.

FIG. 4 illustrates a first three-dimensional position $x_1$, $y_1$, $z_1$, in the virtual three-dimensional space 200', of the camera when the first image was captured. That is, the first three-dimensional position $x_1$, $y_1$, $z_1$ represents the position of the camera (that is in real space 200) in the virtual space 200'.

In some examples, the method may include determining the position of the camera in real space 200, and transforming the determined position to the position of the camera in virtual space 200' (i.e. the first position $x_1$, $y_1$, $z_1$).

In some examples, determining the position of the camera in virtual space may include determining an absolute position and/or a relative position of the camera in real space 200. For example, the headset 204 may receive data from one or more position sensors (not shown), for example infrared position sensors, located in the real space 200, arranged to determine a position in real space 200 of the headset 204. The position of the headset 204 relative to the sensors may be determined, for example by trilateration or the like. The absolute position of the sensors in the real space 200 may be known and fixed. The absolute position of the headset 204 in real space 200 may then be determined based on the absolute position of the sensors and the position of the headset 204 relative to the sensors. In another example, the headset 204 may include devices for determining the position of the headset 204 relative to some initial position of the headset 204. For example, the headset 204 may include an accelerometer and a gyroscope arranged to track movement of the headset 204 in the real space 200 from a given initial position (which may be known). The position of the headset 204 at a given subsequent time may therefore be determined based on the initial position and the tracked movement of the headset since the headset 204 was in the initial position. As another example, the camera may be a depth camera, for example a RGBD (Red Green Blue Depth) camera. The depth information may be used to map and identify features of the real space environment 200. The position and orientation of the camera may then be determined and tracked relative to a given feature of the real space environment, thereby providing the position and orientation of the camera in real space 200.

In some examples, the real space 200 and the virtual space 200' coordinate systems may be or may be assumed to be coincident, and in this case, a transformation between them may not be performed or may not change the real space coordinates. However, in some examples, a coordinate transformation may be performed to transform the position of the camera in real space 200 to the position of the camera as represented in virtual space 200'. The coordinate transformation may be achieved by applying suitable operations to the real space coordinate system, for example by applying suitable translations, rotations, and/or scaling.

As described, the virtual space 200' is discretised so that each discrete position within the virtual space may be given as an indexed coordinate as $x_i$, $y_j$, $z_k$. Further, the virtual space is discretised into discrete orientations. Specifically, each discrete position $x_i$, $y_j$, $z_k$ is associated with a plurality of discretised orientations, which in total may cover all discrete orientations within the 3D virtual space associated with the discrete position. For example, each discrete orientation may be defined using two angles $\theta$ and $\Phi$, where $\theta$ is the angle that a direction associated with the orientation makes with the x axis, and $\Phi$ is the angle that the direction makes with the y axis. The orientations may be discretised such that each discrete orientation, associated with a given discrete position $x_i$, $y_j$, $z_k$ within the virtual space 200', may be given as indexed angles $\Phi_l$, $\theta_m$.

FIG. 4 illustrates a first direction 206', in the virtual 3D space, of the camera when the first image is captured. The first direction 206' may be substantially colinear with the focal axis of the camera, as it is determined to be in virtual space 200'. The first direction 206' is defined by a first orientation $\Phi_1$, $\theta_1$. That is, $\Phi_1$ is the angle that the first direction 206' makes with the y axis, and $\theta_1$ is the angle that the first direction 206' makes with the x axis. The first orientation $\Phi_1$, $\theta_1$ may therefore be thought of as representative of the orientation (in virtual space 200') of the camera when the first image is captured.

In some examples, the method may include determining the orientation of the camera in real space 200, and transforming the determined orientation to the orientation of the camera in virtual space 200' (i.e. the first orientation $\Phi_1$, $\theta_1$). Determining the orientation of the camera in real space may be performed in a similar way as described for the position, for example by using a suitable internal gyroscope, or by suitable external infrared sensors, and/or by using depth information e.g. in cases where the camera is a depth camera. Similarly, determining the orientation of the camera in virtual space 200' may include applying a transformation to the orientation in real space 200, for example using rotation operations as appropriate.

The position and orientation of the camera, when the first image was taken, in virtual space 200' may therefore be given by a 5-dimensional coordinate $x_1$, $y_1$, $z_1$, $\Phi_1$, $\theta_1$. Indeed, all of the discretised positions and orientations within the virtual space 200' may be given by a 5-dimensional indexed coordinate $x_i$, $y_j$, $z_k$, $\Phi_l$, $\theta_m$.

As described, the first plurality of pixel values are from the first image 208 captured by a camera in real space 200. The first plurality of pixel values is associated with the first three-dimensional position $x_1$, $z_1$, $z_1$, in the virtual three-dimensional space, of the camera when the first image 208 was captured. Each one of the first plurality of pixel values is associated with an orientation, in the virtual three-dimensional space, of a portion of a light field represented by the pixel (as described hereinafter).

Figure 5:
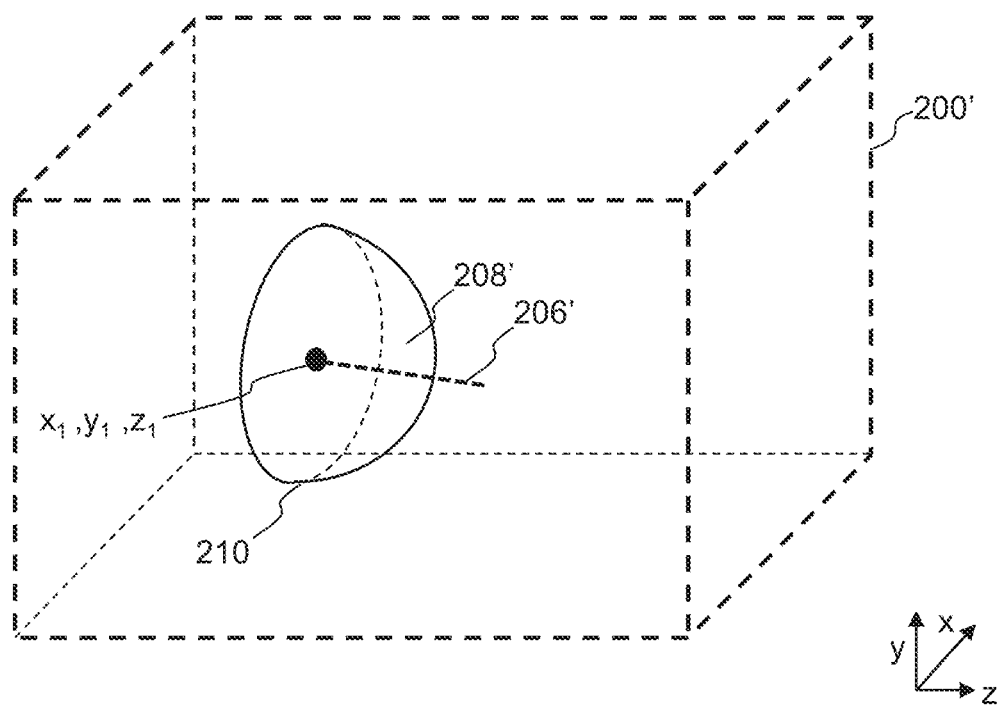
FIG. 5 is a schematic diagram that illustrates the virtual space of FIG. 3 with the image of FIG. 4 projected onto a hemisphere, according to an example.

As described, the first image 208 is associated with an orientation $\Phi_1$, $\theta_1$ in virtual space 200' of the camera when the first image 208 was captured. FIG. 5 illustrates schematically an example way of determining an orientation, in the virtual three-dimensional space, of a portion of a light field represented by each pixel value. In overview, the method includes projecting the pixel values of the first image 208 onto a hemisphere 210 located at the first three-dimensional position $x_1$, $y_1$, $z_1$; and determining, based on the projection, the orientation $\Phi_l$, $\theta_m$ with which each pixel value is associated.

Each pixel value, having planar coordinates p, q, of the 2D first image 208 may be projected or mapped onto a point on the surface 208' of the 3D hemisphere 210 according to the position p, q of that pixel in the 2D image. The hemisphere 210 may be constructed so that its principal axis is colinear with the first direction 206' (having an orientation defined by $\Phi_1$, $\theta_1$). The first image 208 may be projected onto the hemisphere 210 for example using equirectangular projection, in which the planar coordinates p, q of each pixel of the first image 208 is mapped to spherical coordinates $\Phi'$, $\theta'$ of the hemisphere.

In some examples, the pixel values mat be projected (e.g. using equirectangular projection) onto a cosine weighted hemisphere. In these examples, the projection of planar coordinates p, q onto the spherical coordinates $\Phi'$, $\theta'$ of the hemisphere 210 is weighted so that proportionally more pixel values are projected to smaller angles $\Phi'$, $\theta'$ than to larger angles $\Phi'$, $\theta'$ (relative to the first direction 206'). For example, the pixel values may be sampled and projected onto the hemisphere according to the weighting $\theta'=\arccos(\sqrt{R1})$; $\Phi'=2\pi R2$, where R1 and R2 are random numbers between 0 and 1.

In any case, the spherical coordinates $\Phi'$, $\theta'$ associated with a pixel value following the projection may be used to define the orientation in the virtual 3D space 200' associated with that pixel value. In examples where the virtual 3D space 200' is discretised, the orientation associated with each pixel value may be given by the indexed orientation $\Phi_l$, $\theta_m$. Therefore, each pixel value of the first image 208 may be associated with a 5-dimensional indexed coordinate $x_1$, $y_1$, $z_1$, $\Phi_l$, $\theta_m$.

Following the projection onto the hemisphere 210, each pixel value is taken as a value representative of a portion of a light field at the position and orientation $x_1$, $y_1$, $z_1$, $\Phi_m$, $\theta_m$ of the pixel value in virtual space 200'. For example, the pixel value may be taken as a radiance, or amount of light, at the position and orientation $x_1$, $y_1$, $z_1$, $\Phi_l$, $\theta_m$ of the pixel value in virtual space 200'.

At this point, the light field at each of the other discretised positions and orientations $x_i$, $y_j$, $z_k$, $\Phi_l$, $\theta_m$ in the virtual space 200' may be unknown. However, in order to realistically render a virtual object at a second position in the virtual space 200 that is other than the first position $x_1$, $y_1$, $z_1$, an estimate of one or more light field values at that second position should be determined (as described hereinafter).

Figure 6:
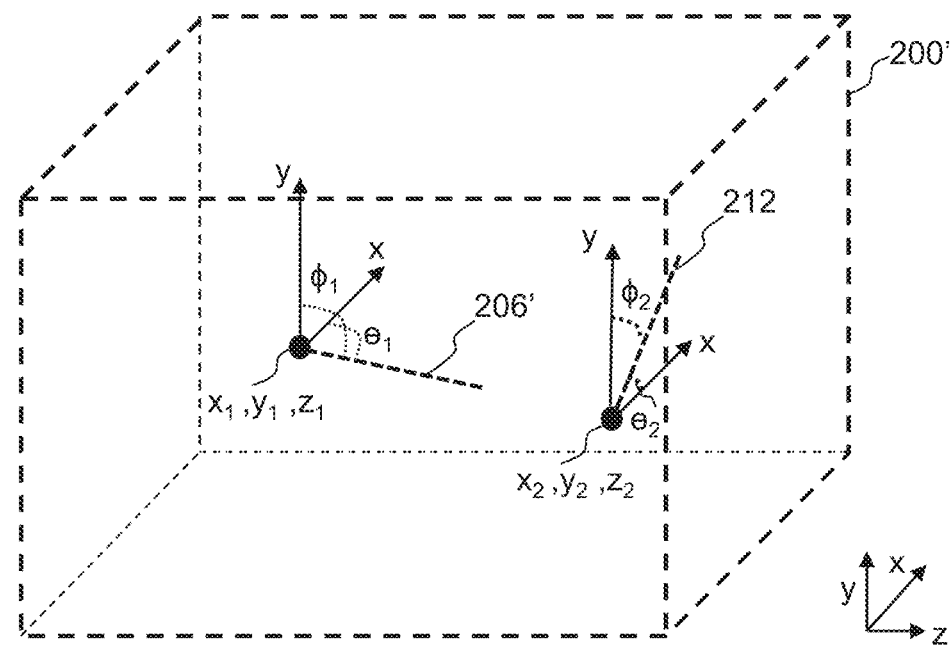
FIG. 6 is a schematic diagram that illustrates the virtual space of FIG. 3 but including an estimated light field value for a second position, according to an example.

As mentioned, in step 104 of the method described with reference to FIG. 1, the method includes estimating, based on the first plurality of pixel values, a light field value for at least one second position $x_2$, $y_2$, $z_2$, different from the first position $x_1$, $y_1$, $z_1$, in the virtual three-dimensional space 200'. For example, referring to FIG. 6, the light field value may be the radiance, or an amount of light, from a given direction 212 having a given orientation $\Phi_2$, $\theta_2$ at the second position $x_2$, $y_2$, $z_2$. As described in more detail hereinafter, the estimate is made using compressive sensing.

As mentioned, in step 106 of the method described with reference to FIG. 1, the method includes rendering an object 214, in the virtual three-dimensional space 200, located at the second position $x_2$, $y_2$, $z_2$, using the estimated light field value. For example, with reference to FIG. 7, a virtual object 214 (in this example a cuboid) is to be rendered at a second position $x_2$, $y_2$, $z_2$, so that virtual object 214 may appear, via the AR or VR headset 204 (not shown in FIG. 7), as present at the second position $x_2$, $y_2$, $z_2$, to the user 202 (not shown in FIG. 7). FIG. 8 illustrates schematically an example of an image 216 including the first image 208 augmented, for example overlaid, with an image 214' of the object 214 rendered using the estimated light field values. As another example, the image 216 may be a virtual image, which may for example be derived from the first image 208, and which includes the image 214' of the object 214 rendered using the estimated light field values. The example image 216 may, for example, be displayed on a display screen of the AR or VR headset 204 such that the virtual object 214 may appear as present at the second position $x_2$, $y_2$, $z_2$, from the perspective of the user.

Figure 7:
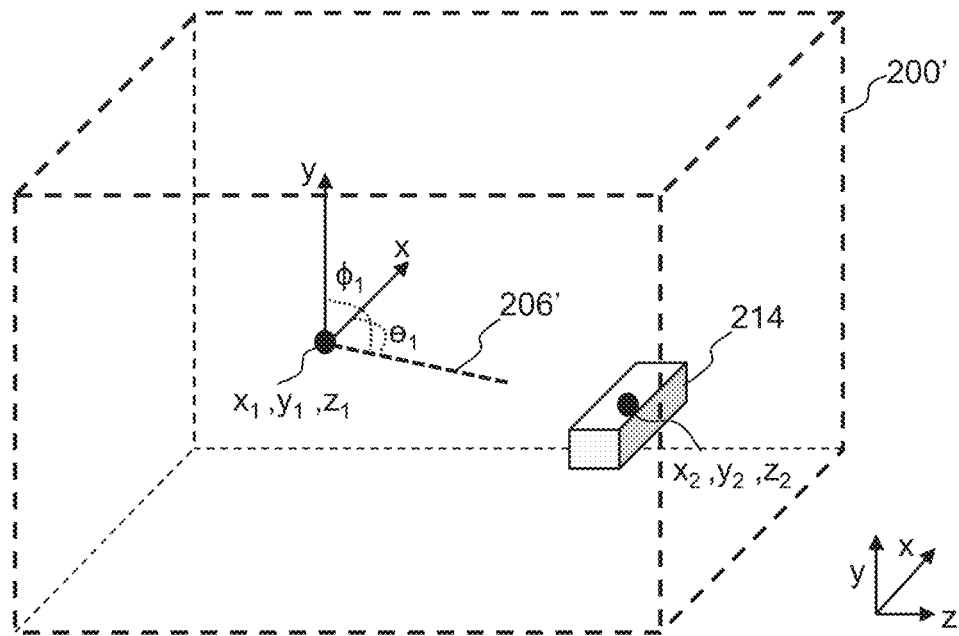
FIG. 7 is a schematic diagram that illustrates the virtual space of FIG. 6 with a virtual object at the second position to be rendered using the estimated light field value, according to an example.
Figure 8:
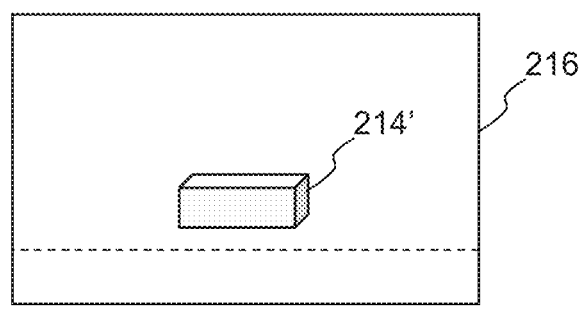
FIG. 8 is a schematic diagram that illustrates an image for display on the AR/VR headset of FIG. 2, including the object rendered using the estimated light field value, according to an example.

The estimated light field value, e.g. a radiance value, or other lighting condition value, at the second position $x_2$, $y_2$, $z_2$, and having a given orientation $\Phi_2$, $\theta_2$, may be used in the rendering of the virtual object 214 on a display screen of the VR or AR headset of the user (not shown in FIG. 7). For example, the light field value may be used as a lighting condition of the virtual object 214 during rendering of the virtual object 214. As such, the rendering of the virtual object 214 located in the virtual space 200' may be based on an estimate of the lighting condition that the virtual object 214 would experience if it were in the real space 200. A realistic rendering of the virtual object 214 may therefore be generated.

As mentioned, the estimation of the light field value for the second position $x_2$, $y_2$, $z_2$ from the plurality of first pixel values uses compressive sensing.

Compressive sensing, also known as compressed sensing, compressive sampling, or sparse sampling, is a signal processing technique for efficiently reconstructing a signal from sample values of the signal by finding a solution to an underdetermined system of linear equations by optimisation. An underdetermined system of linear equations has more unknowns than equations and as such may have many, and in some cases infinite, solutions. In the present example, the signal to be recovered is the light field at each position and orientation $x_i$, $y_j$, $z_k$, $\Phi_l$, $\theta_m$ in the discretised virtual space 200', the sample values are the light field values represented by the first plurality of pixels at the first position $x_1$, $y_1$, $z_1$, $\Phi_l$, $\theta_m$, and the system of linear equations is that which transforms the latter to the former. Since the total number of positions and orientations $x_i$, $y_j$, $z_k$, $\Phi_l$, $\theta_m$ in the discretised virtual space 200' is much larger than the number of orientations at the first position $x_1$, $y_1$, $z_1$, $\Phi_l$, $\theta_m$, it will be appreciated that the system of linear equations is underdetermined.

In compressive sensing, the signal to be reconstructed is assumed to be sparse in some domain (which may be the same as or different to the domain in which the samples are captured). Hence a condition is applied to the solutions of the system of underdetermined linear equations that the solution must be sparse, that is, that only solutions having a small number (or indeed only the solution having the smallest number) of non-zero coefficients are/is accepted as solutions (or the solution) to the system of linear equations. Light field images are sparse. Therefore, light field values may be considered as sparse signals, for example as the light field values are not pure noise. Accordingly, in some examples, estimating the light field value at the second position $x_2$, $y_2$, $z_2$, $\Phi_l$, $\theta_m$ using compressive sensing includes reconstructing, from the first plurality of pixel values associated with the first position $x_1$, $y_1$, $z_1$, $\Phi_l$, $\theta_m$ the light field value at each of the discrete positions and discrete orientations, by estimating a solution to an underdetermined set of linear equations. The solution is estimated by determining the solution with a small, for example, the smallest number of non-zero coefficients. This may be performed using optimisation techniques, such as $l_1$ norm minimisation, described in more detail hereinafter.

Of course, a system of linear equations may be represented in matrix form. For example, the system of underdetermined linear equations to be solved may be written as f=Θe. In this example, f is a s×1 (column) vector of the plurality of first pixel values indexed for the first discrete position $x_1$, $y_1$, $z_1$ and for the discrete orientations $\Phi_l$, $\theta_m$ with which each pixel value is associated. In other words, f may be a column vector whose entries correspond to the first plurality of pixel values stacked in a predetermined order (e.g. indexed for each discrete orientation with which the pixel value is associated). In this example, e is an t×1 vector, where s<t, of estimated light field values indexed for all of the discrete positions and discrete orientations $x_i$, $y_j$, $z_k$, $\Phi_l$, $\theta_m$ into which the virtual three-dimensional space 200' is discretised. In other words, e may be a column vector whose entries correspond to (to be determined) light field values stacked in a predetermined order (e.g. indexed for each discrete position and orientation with which the light field value is associated). For example, at least initially, the vector e may be populated with random values. In this example, Θ is a s×t transformation matrix for reconstructing e from f. In some examples, the transformation matrix may be a single matrix for reconstructing e from f. For example, the transformation matrix may be a sensing matrix. For example, the sensing matrix may be a matrix Gaussian distribution, that is, a matrix populated with real-valued random numbers taken from a Gaussian distribution (independent standard Gaussian random variables). As another example, the sensing matrix may be a random permutation matrix, for example an identity matrix that is subject to a random permutation.

As mentioned, the equation f=Θe may be solved for e by iteration subject to the minimisation of the number of non-zero coefficients of e. This may be achieved, for example by the minimisation of the the $l_1$ norm of e. The $l_1$ may be regarded as a function that counts the number of non-zero coefficients of a vector. In mathematical notation, the $l_1$ norm, $\|e\|_1$, of vector e may be written as $\|e\|_1 = \sum_{r=1}^{n} |e_r|$, where $|e_r|$ is the modulus of the $r^{th}$ indexed entry of the vector. Various algorithms may be applied to minimising the $l_1$ norm of e, hence finding a sparse solution to $f=\Theta e$, to recover an estimate for the light field values at each of the discrete positions and discrete orientations $x_i$, $y_j$, $z_k$, $\Phi_l$, $\theta_m$ or the virtual space 200'. For example, an algorithm may be applied that minimises $\|e\|_1$, subject to $\|\Theta e - f\|_2 \leq \in$, where $\in$ is a predetermined error parameter, and $\|\Theta e - f\|_2$ represents the $l_2$ norm of $\Theta e - f$, i.e. $\|\Theta e - f\|_2 = (\sum_{r=1}^{n} |\Theta e - f_r|^2)^{1/2}$. In this case, if a sparse solution $e_0$ exists such that $f = \Theta e_0 + b$, for some small error term $\|b\|_2 \leq \in$ then the algorithm will return a solution close to $e_0$. Alternatively or additionally, the $l_1$ norm may be minimised using other algorithms or techniques, for example using line search or gradient search techniques.

In some examples, the transformation matrix $\Theta$ may be a combination (for example include a multiplication of) two or more matrices. For example, in some examples, the transformation matrix $\Theta$ may include a matrix multiplication of a sensing matrix $\Phi$ (which may for example be the same as the sensing matric described above, for example a matrix Gaussian distribution), and a representation matrix $\Psi$ for transforming e into a sparse domain. In other words, in some examples, $\Theta = \Phi \Psi$. Using the representation matrix $\Psi$ in addition to the sensing matrix $\Phi$ may provide that the vector e may be more sparsely represented, which may provide for faster and or more accurate minimisation of the $l_1$ norm of e. For example, the representation matrix $\Psi$ may be an orthogonal basis matrix. For example, the representation matrix $\Psi$ may be a Discrete Fourier Transform (DFT) matrix. For example, the Discrete Fourier Transform matrix may be a 5-dimensional DFT matrix, one dimension each for $x_i$, $y_j$, $z_k$, $\Phi_l$, $\theta_m$. In other words, the DFT matrix may be populated with Fourier transform coefficients of 5-dimensional (discrete) Fourier basis functions (i.e. each entry of the DFT matrix is the i, j, k, l, mth coefficient of a 5-dimensional discrete Fourier transform). The Fourier transform may be of the type used for periodic and discrete signals. In other examples, other basis functions may be used for the representation matrix, for example Discrete Cosine Transform bases, Wavelet transform bases or 3D Zernike Descriptor bases.

In cases where the transformation matrix $\Psi$ is used, the compressive sensing may include minimising the $l_1$ norm of e for the equation $f = \Phi \Psi e$, for example as described above. However, in this case, the resultant e will be in the spare domain into which it was transformed by the application of the transformation matrix $\Psi$. However, since the transformation matrix $\Psi$ is an orthogonal basis matrix, the inverse of $\Psi$ may be applied to the solution e, in order to return the estimate of the light field values at all the discretised positions and orientations $x_i$, $y_j$, $z_k$, $\Phi_l$, $\theta_m$ within the virtual three-dimensional space 200'. In this case therefore, the method may include applying, after the minimization of the $l_1$ norm of e, the inverse $\Psi^{-1}$ of the transformation matrix $\Psi$ to e, to obtain the estimate of light field values at all the discretised positions and orientations $x_i$, $y_j$, $z_k$, $\Phi_l$, $\theta_m$ within the virtual three-dimensional space 200'.

In either case, as a result of the compressive sensing based on the first plurality of pixel values, an estimate of light field values at all the discretised positions and orientations $x_i$, $y_j$, $z_k$, $\Phi_l$, $\theta_m$ within the virtual three-dimensional space 200' is obtained. The method may include determining the second position $x_2$, $y_2$, $z_2$ at which the virtual object 214 is to be rendered, obtaining the estimated light field values (e.g. radiance values) associated with the second position $x_2$, $y_2$, $z_2$ (for example the light field value of each orientation $\Phi_l$, $\theta_m$ associated with the second position $x_2$, $y_2$, $z_2$), and rendering the virtual object 214 based on the obtained estimated light field values associated with the second position $x_2$, $y_2$, $z_2$.

As described, the estimated light field values, e.g. radiance values, are used to render the virtual object 214, for example for display on a display screen of the VR or AR headset 204 of the user. As such, therefore, a virtual object 214 may be rendered using light field values that accurately represent the lighting condition, at the position of the virtual object 214, as if that virtual object were in real space 200. The virtual object 214 may therefore be rendered realistically. Moreover, the light field values used to render the virtual object 214 are estimated based on pixel values from an image captured by a camera mounted on the VR or AR headset 204. This may allow for the realistic rendering of the virtual object 214 to be performed efficiently, for example without the need to measure light field values at the second location at which the virtual object 214 is rendered. This may allow the processing of the light field values for rendering to be performed relatively quickly and/or using relatively few resources, which may be important in portable VR or AR headsets 204, in which processing resources may be limited.

In some examples, the above described process may be carried out successively for different first images captured over time. The rendering of the virtual object 214 may be performed dynamically based on the successive first images and the estimated light field values derived therefrom, as described above. The method may therefore provide for accurate and efficient rendering that is capable of accounting for dynamic changes to the lighting environment in the real space 200. This may provide for a more realistic experience.

In some examples, further images captured by the camera of the headset 204 may be used in addition to the first image captured by the camera of the headset 204 to provide further sample values for the compressive sensing and hence for a more accurate estimate of the light field values at all the discretised positions and orientations $x_i$, $y_j$, $z_k$, $\Phi_l$, $\theta_m$ within the virtual three-dimensional space 200'. For example, the method may further include obtaining a second plurality of pixel values of a second image captured by the camera in real space 200, the second image being captured at a position or with an orientation in real space 200 different to that of the camera when the first image was captured. Estimating the light field value for the at least one second position may then be based at least in part on the first plurality of pixel values and the second plurality of pixel values. For example, the vector f may be increased in length to include the pixel values indexed for the position and orientation $x_i$, $y_j$, $z_k$, $\Phi_l$, $\theta_m$ associated with each of each the pixel values of the first image and of the second image, to produce vector f'. An accordingly enlarged transformation matrix $\Theta'$ may be generated, and the $l_1$ norm of e for the equation $f' = \Theta' e$ may be minimised in a similar way as to described above. However, in this example, the solution of the equation that was found to minimise the $l_1$ norm of e when only the first plurality of pixel values of the first image was used may now be used as the starting values of e for the $l_1$ norm minimisation of e. These staring values of e may be close to the solution that minimises the $l_1$ norm of e in the equation $f' = \Theta' e$ where f' includes both the first plurality and the second plurality of pixel values. Therefore, the $l_1$ norm minimisation may take less time and/or use less resources as compared to the $l_1$ norm minimisation based on only the first plurality of pixel values. This may provide for improved efficiency in the estimation of light field values at each discrete position and orientation in the virtual space 200', and hence may provide for efficient realistic rendering of objects 214 in that space.

As will be appreciated, as further successive images are captured by the camera of the VR or AR headset 204, for example as the user moves or looks around in the real space 200, further pluralities of pixel values may be added to the sample vector f. This may accordingly improve the accuracy with which the light field values at each position and orientation in the virtual space 200' may be estimated. Further, the more sample values that are used in f, the closer the solution for a given $l_1$ norm minimisation will be to the solution of a subsequent $l_1$ norm minimisation using further pixel values, which may successively reduce the time needed for $l_1$ norm minimisation as successive sample images as captured. This may further improve the efficiency of the light field estimation and hence rendering of virtual objects 214.

In some examples, having an estimate of the light field values at all the discretised positions and orientations $x_i$, $y_j$, $z_k$, $\phi_l$, $\theta_m$ in the virtual space 200' may allow for rendering of the virtual object 214 to include light field-based effects, such as aperture effects (i.e. simulating the focal point of a human eye or the like), or High Dynamic Range (HDR) effects (e.g. eye pupil dilation effects to enforce a range of luminescence similar to that experienced by a human eye) and the like. This may further improve the realism of the rendering of the virtual object 214.

Figure 9:
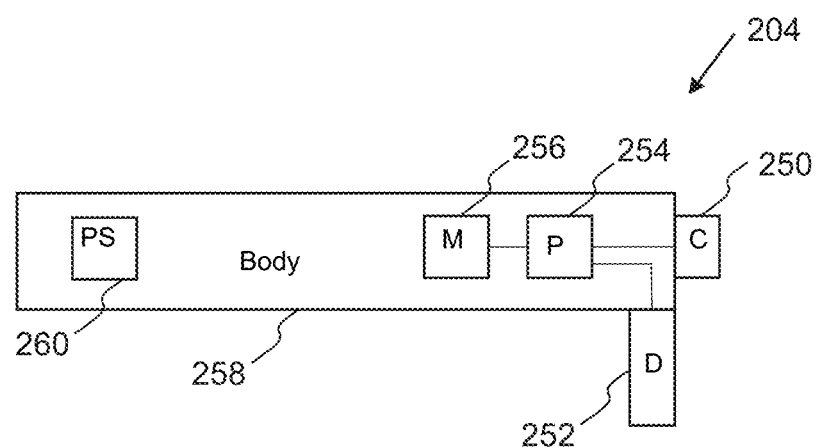
FIG. 9 is a schematic diagram that illustrates an apparatus, for example a AR/VR headset, according to an example.

Referring to FIG. 9, there is illustrated schematically an apparatus 204 according to an example. The apparatus 204 may be arranged to perform a method described above with reference to FIGS. 1 to 8. In this example, the apparatus 204 is the AR or VR headset 204, although it will be appreciated that in other examples the apparatus may take different forms. For example, the method may be performed by a device (not shown) (e.g. a separate device) in communication with the headset 204. For example, the headset 204 may be arranged to send images to the remote device (not shown) and receive from the device an image (e.g. including an image of a virtual object rendered using light field values estimated by the device using the techniques described above based on the first image received by the device) for display on the headset 204 to the user 202.

In the example of FIG. 9, the headset 204 includes a body 258 for mounting to a head of a user 202 of the headset 204. The headset 204 includes a position sensor (PS) element 260, camera (C) 250, a display such as a display (D) screen 252, a processor (P) 254 and a memory (M) 256. The processor 254 is communicatively connected to the position sensor element 260, the memory 256, the camera 250 and the display 252. The focal axis of the camera 250 may be parallel, for example substantially co-linear with an eyeline of the user. The position sensor element 260 is arranged to determine the position and orientation of the camera 250 in real space 200, for example using the methods described above.

The memory 256 may store instructions which when executed by the processor 254 cause the processor 254 (and in some cases the camera 250 and the display 252) to perform the method described above with reference to FIGS. 1 to 8. For example, the processor 254 may be configured to obtain a first image 208 captured by the camera 250, and to determine a first plurality of pixel values of the first image 208. The processor 254 may be configured to associate the first plurality of pixel values with a first three-dimensional position $x_1$, $y_1$, $z_1$, in the virtual three-dimensional space 200', of the camera 250 when the first image 208 was captured (for example as determined or informed by the position sensor element 260), for example using the techniques as described above. The processor 254 may be configured to associate each one of the first plurality of pixel values with an orientation $\phi_l$, $\theta_m$, in the virtual three-dimensional space 200', of a portion of a light field represented by the pixel, for example as described above. The processor 254 may be configured to estimate, using compressive sensing, and based on the first plurality of pixel values, a light field value for at least one second position $x_2$, $y_2$, $z_2$, different from the first position $x_1$, $y_1$, $z_1$, in the virtual three-dimensional space 200', for example using the techniques as described above. The processor 254 may be arranged to render a virtual object 214, in the virtual three-dimensional space 200', located at the second position $x_2$, $y_2$, $z_2$, using the estimated light field value, for example using the techniques as described above.

The processor 254 may be configured to control the display 252 to display an image of the virtual object 214 having been rendered using the light field values estimated as described above. For example, the processor may be configured to control the display 252 to display an image captured by the camera 250 but augmented with a virtual object 214 having been rendered using the light field values estimated as described above. As another example, the display 252 may display a virtual image, which may for example be derived from the image captured by the camera 250, and which includes an image of an object 214 rendered using the estimated light field values.

As such the headset 204 may provide that a virtual object 214 may be rendered using light field values that accurately represent the lighting condition, at the position of the virtual object 214, as if that virtual object were in real space 200. The virtual object 214 may therefore be rendered realistically, for example especially in closed real space environments such as operation rooms or classrooms. Moreover, the light field values used to render the virtual object 214 are estimated based on pixel values from an image captured by the camera 250 mounted on the VR or AR headset 204. This may allow for the realistic rendering of the virtual object 214 to be performed efficiently, for example without the need to measure light field values at the second location at which the virtual object 214 is rendered. This may allow the processing of the light field values for rendering to be performed relatively quickly and/or using relatively few resources, which may allow the headset 204 to be lighter and/or consume less power and/or extend a battery life of the headset 204, for example.

The headset 204 may be arranged to estimate light field values and render virtual objects using successive images captured by the camera 250, for example using the techniques as described above. As described, this may improve the accuracy and/or efficiency with which the light field values at each position and orientation in the virtual space 200' may be estimated, and hence may improve the efficiency and/or realism of the rendering.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of rendering an object in a virtual three-dimensional space, the method comprising:
   obtaining a first plurality of pixel values of a first image captured by a camera in real space, the first plurality of pixel values being associated with a first three-dimensional position, in the virtual three-dimensional space, of the camera when the first image was captured, each one of the first plurality of pixel values being associated with an orientation in the virtual three-dimensional space, of a portion of a light field represented by the pixel;
   estimating, using compressive sensing, and based on the first plurality of pixel values, a light field value for at least one second position, different from the first position, in the virtual three-dimensional space, wherein estimating the light field value using compressive sensing comprises estimating a solution to an underdetermined set of linear equations by input of the first plurality of pixel values of the first image to the linear equations, the solution of the compressed sensing providing an output of the light field value and orientation for the second position as a three-dimensional location other than planar coordinates of the first image; and
   rendering the object, in the virtual three-dimensional space, located at the second position, using the estimated light field value.

2. The method according to claim 1, wherein the method further comprises:
   determining a position and orientation of the camera in real space; and
   determining, based at least in part on the determined position and orientation of the camera in real space, the first position in the virtual three-dimensional space and the orientation, in the virtual three-dimensional space, with which each pixel value is associated.

3. The method according to claim 2, wherein determining the orientation with which each pixel value is associated comprises:
   projecting the pixel values of the first image onto a hemisphere located at the first position; and
   determining, based on the projection, the orientation with which each pixel value is associated.

4. The method according to claim 3, wherein projecting the pixel values of the first image onto the hemisphere comprises:
   using equirectangular projection of the pixel values of the first image onto a cosine weighted hemisphere.

5. The method according to claim 1, wherein the method further comprises:
   capturing the first image using the camera (250).

6. The method according to claim 5, wherein the camera is mounted to an augmented reality or virtual reality headset.

7. The method according to claim 6, wherein rendering the object comprises rendering a representation of the object on a display screen of the augmented reality or virtual reality headset.

8. The method according to claim 1, wherein the virtual three-dimensional space is discretised into discrete positions and discrete orientations, each discrete position being associated with a plurality of the discrete orientations; wherein each of the one or more orientations with which each pixel value is associated is a discrete orientation, wherein the first position is a first discrete position, and wherein the second position is a second discrete position, different to the first discrete position.

9. The method according to claim 8, wherein estimating the light field value using compressive sensing comprises reconstructing, from the first plurality of pixel values associated with the first discrete position, the light field at each of the discrete positions and discrete orientations, by the estimating of the solution to the underdetermined set of linear equations.

10. The method according to claim 8, wherein estimating the light field value using compressive sensing comprises:
    minimizing the $l_1$ norm of e in the equation $f=\Theta e$;
    where:
    f is an s×1 vector of the plurality of first pixel values indexed for the first discrete position and for the discrete orientations with which each pixel value is associated;
    e is a t×1 vector, where s<t, of estimated light field values indexed for all of the discrete positions and discrete orientations into which the virtual three-dimensional space is discretised; and
    $\Theta$ is a sxt transformation matrix for reconstructing e from f.

11. The method according to claim 10, wherein $\Theta=\Phi\Psi$, where:
    $\Psi$ is a representation matrix for transforming e into a sparse domain; and
    $\Phi$ is a sensing matrix comprising a set of predetermined random values; and
    wherein the method further comprises applying, after the minimization of the $l_1$ norm of e, the inverse of $\Psi$ to e, to obtain the estimate of light field values at all the discretised positions and orientations within the virtual three-dimensional space.

12. The method according to claim 11, wherein $\Psi$ is a Discrete Fourier Transform matrix.

13. The method according to claim 1, wherein the light field value comprises a radiance value.

14. The method according to claim 1, wherein the method further comprises:
    obtaining a second plurality of pixel values of a second image captured by the camera in real space, the second image being captured at a position or with an orientation in real space different to that of the camera when the first image was captured;
    wherein estimating the light field value for the at least one second position is based at least in part on the first plurality of pixel values and the second plurality of pixel values.

15. An apparatus for rendering an object in a virtual three-dimensional space, the apparatus comprising:
    a camera configured to obtain a first plurality of pixel values of a first image in real space, the first plurality of pixel values being associated with a first three-dimensional position, in the virtual three-dimensional space, of the camera when the first image was captured, each one of the first plurality of pixel values being associated with an orientation in the virtual three-dimensional space, of a portion of a light field represented by the pixel; and
    a processor configured to estimate, using compressive sensing, and based on the first plurality of pixel values, a light field value for at least one second position, different from the first position, in the virtual three-dimensional space, wherein the estimation of the light field value using compressive sensing comprises estimation of a solution to an underdetermined set of linear equations by input of the first plurality of pixel values, the solution of the compressive sensing providing an output of the light field value for the second position as a three-dimensional location other than planar coordinates of the first image;

the processor configured to render the object, in the virtual three-dimensional space, located at the second position, using the estimated light field value.

16. The apparatus according to claim 15, further comprising an augmented reality or a virtual reality headset, the camera and/or the processor being part of the augmented reality or virtual reality headset.

17. A non-transitory computer readable storage medium having stored therein data representing instructions which, when performed by a computer, cause the computer to render an object in a virtual three-dimensional space, the instructions comprising:

obtain a first plurality of pixel values of a first image captured by a camera in real space, the first plurality of pixel values being associated with a first three-dimensional position, in the virtual three-dimensional space, of the camera when the first image was captured, each one of the first plurality of pixel values being associated with an orientation in the virtual three-dimensional space, of a portion of a light field represented by the pixel;

estimate, using compressive sensing, and based on the first plurality of pixel values, a light field value for at least one second position, different from the first position, in the virtual three-dimensional space, wherein the instruction to estimate the light field value using compressive sensing comprises an instruction to estimate a solution to an underdetermined set of linear equations by input of the first plurality of pixel values, the solution of the compressed sensing providing an output of the light field value for the second position as a three-dimensional location other than planar coordinates of the first image; and render the object, in the virtual three-dimensional space, located at the second position, using the estimated light field value.

* * * * *